United States Statutory Invention Registration [19]

[11] Reg. Number: H401

Ibach

[43] Published: Jan. 5, 1988

[54] PENETRATOR MUNITION

[75] Inventor: David R. Ibach, Anoka, Minn.

[73] Assignee: The United States of America as represented by the Secretary of the Army, Washington, D.C.

[21] Appl. No.: 42,488

[22] Filed: Apr. 20, 1987

[51] Int. Cl.[4] ..... B21D 22/00

[52] U.S. Cl. ..... 72/356; 29/1.2; 72/352

*Primary Examiner*—Harold J. Tudor

*Attorney, Agent, or Firm*—Anthony T. Lane; Harold H. Card, Jr.; Michael C. Sachs

[57] ABSTRACT

The method of manufacture of a sabot component which comprises the steps of severing an aluminum workpiece from bar stock, upsetting the workpiece in a first die, by axial force, to constitute a first preform having a desired uneven mass distribution along the axis thereof, hot forging the first preform in a second die, by transverse force, to constitute a second preform having an unsymmetrical mass distribution transverse to the axis thereof, hot forging the second preform in a third die, by transverse force, to constitute a stamping having apposed unsymmetrical formed surfaces, solution heat treating the stamping to a "W" condition, freezing the stamping to render its metalography dormant, cold forging the stamping in the third die, artificially aging the stamping to a "T8" condition, trimming the stamping in a fourth die, and annodizing the trimmed stamping.

2 Claims, 10 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PENETRATOR MUNITION

The Government has rights in this invention pursuant to Contract No. DAAK10-82-C-0296, awarded by the Department of the Army.

FIELD OF THE INVENTION

This invention relates to the field of munitions, and more particularly to munitions to be used against armored targets. It contemplates decreasing the cost of such munitions by redesign of a sabot for manufacture by forming rather than by full machining.

BACKGROUND OF THE INVENTION

In the field of munitions it is often necessary to attack targets which are armored so that simple explosion of a munition against the armor is not sufficient to disable the target. For such use there have been developed projectiles known as "penetrators" which are not necessarily explosive on impact, but are of density, configuration, and propulsive force sufficient for maximum penetrating effects. One such device is known as a "long rod" penetrator: it is of dense metal such as a tungsten alloy, and is of relatively small diameter compared to the bore of the cannon generally available. It extends along a longitudinal axis from a forward, aerodynamic point to a rearward stabilizing fin structure. To obtain sufficient propulsion force, it is necessary to make these projectiles parts of munitions having cartridge cases several times the diameter of the body of the projectile, although of course the mouth of the cartridge case must be large enough to pass the rearward fin structure of the projectile. Means must also be provided for guiding the relatively small penetrator down the larger barrel of the firing piece and preventing the escape of propulsive gases down the barrel past the projectile.

These functions have been accomplished in the past by providing the penetrator with circumferential external buttress grooves along its midportion and engaging similar internal grooves in a bi-partite "sabot" secured in place by a loosely fitting "obturator ring" of nylon which rides in the rifling of the discharging barrel, thus preventing escape of propulsion gases. Rearwardly the sabot is grooved for crimped connection with the mouth of the cartridge case, within which the fin structure of the penetrator is received. Forwardly the sabot is configured to cooperate with a protective cap during travel through the barrel: cap, ring, and sabot separate from the penetrator upon leaving the barrel, to avoid increasing the drag of the penetrator during flight.

BRIEF SUMMARY OF THE INVENTION

The present invention contemplates redesigning the sabot so that its parts can be made by metal forming, using a preformed rod and a compound die. In order to accomplish this, the amount of metal flow required in going from bar stock to the completed stamping is so great that special procedures must be followed if a precise product of stable dimensions is to result. This application is directed specifically to a method of manufacturing a two-part sabot by stamping.

Various advantages and features of novelty which characterize the invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

BRIEF DESCRIPTION OF THE DRAWING

In the drawing, in which like reference numerals identify corresponding parts throughout the several views.

DETAILED DESCRIPTION OF THE PREFERRED EMBODIMENT

Figure 1:
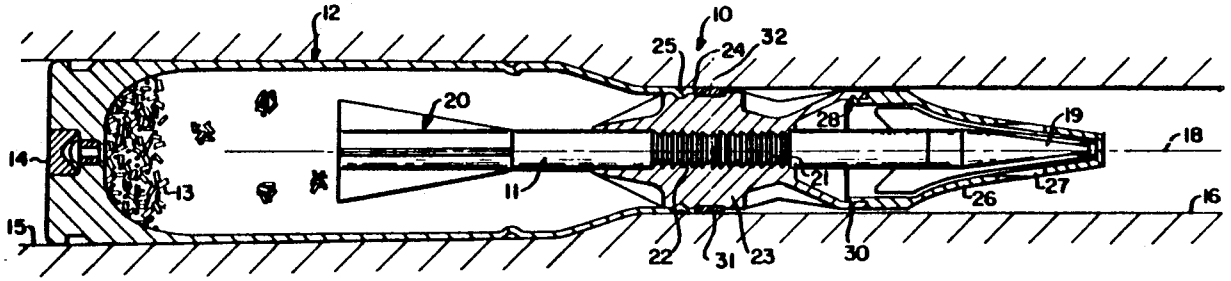
FIG. 1 is a general view of a munition of the type in question.

As shown in FIG. 1, a munition 10 according to the invention comprises a penetrator 11 arranged for firing from a cartridge case 12 containing a propulsion explosive 13 which is fired when a primer or percusion cap 14 is impacted by the firing pin of the gun, not shown. The munition as shown is inserted into the chamber 15 of the firing piece, which has a barrel 16.

The penetrator is shown to extend along a longitudinal axis 18 from a forward portion 19, pointed for aerodynamic reasons, to a rearward fin section 20, for flight stabilization. Approximately at its midportion, the penetrator is provided with a set of circumferential buttress grooves 21 for engagement by matching grooves 22 in a sabot 23 to which the mouth 24 catridge case 12 is crimped at a groove 25. A forwardly tapering protective cap 26 has forward apertures 27 and a rearward lip 28 which engages a forward groove 30 in sabot 23. An obturator ring or a band 31 of nylon surrounds the rearward portion of sabot 23, and is received in a channel 32.

In the prior art, sabot 23 was bi-partite, consisting of a pair of machined metallic members having a plane mating face containing the axis 18 of the munition, and held together, and into cap 26, by nylon band 31 which was expanded over the sabot and allowed to contract into peripheral channel 32.

Figure 2:
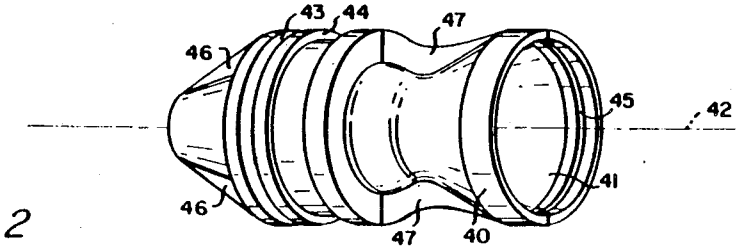
FIG. 2 shows a sabot according to the invention.

FIG. 2 shows a sabot according to the invention to a slightly larger scale. It is made up of two identical halves 40 and 41 having a mating plane containing the common axis 42. Jointly the halves define a crimping groove 43, a channel 44 for band 31, and a groove 45 for cap 26. The halves are manufactured by a stamping procedure, which forms both the convex outer portion and the concave inner portion containing the necessary buttress grooves. By reason of the forming procedure it is also possible to produce sabot halves with webs 46 and 47 which give a longitudinal stiffening to the structure not readily obtainable in prior, all machined units.

Figure 3:
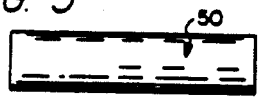
FIGS. 3–8 show steps in the manufacture of a sabot half according to the invention.
Figure 4:
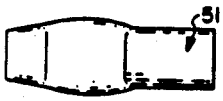
Figure 5A:
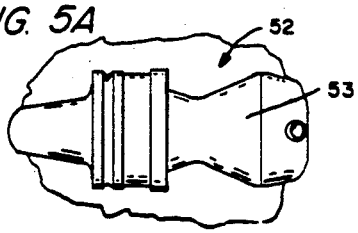
Figure 5B:
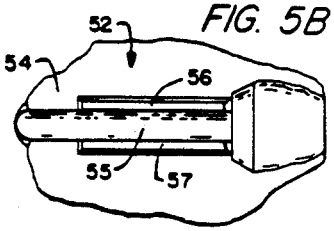

The steps followed in manufacturing half sabots according to the present invention will now be described, referring to FIGS. 3–8. The units can be made of aluminum or magnesium, and FIG. 3 shows a workpiece 50 severed from bar stock for further treatment. The workpiece is first upset in a first die, by axial force, to produce a first preform 51 having a desired uneven mass distribution along its axis to facilitate further forming. Preform 51 is next hot-forged in a second die, by transverse force, to produce a second preform 52, opposite views of which are shown in FIGS. 5A and 5B. It will be apparent that preform 52 has an unsymmetrical mass distribution transverse to the axis, with opposite unsymmetrically formed faces 53 and 54, the latter being generally flat but having a longitudinal groove or cavity 55 bordered by raised ridges 56 and 57.

Figure 6A:
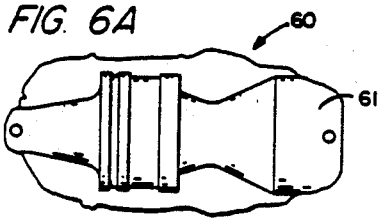
Figure 6B:
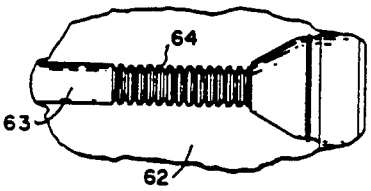
Figure 7:
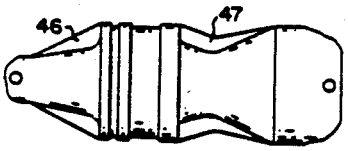
Figure 8:
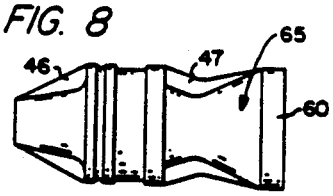

Preform 52 is next hot-forged in a third die, by transverse force, to constitute a first stamping 60 shown in FIG. 6 to have opposite unsymmetrically formed surfaces 61 and 62, the latter again being basically flat but including a longitudinal cavity 63 having a buttress thread portion 64. The provision of ridges 56 and 57 in second preform 52 has been found to materially improve the sharpness of the buttress threads at the flat surface of first scamping 60.

Because of the relatively large change in dimensions and the metal flow necessary to accomplish this, the first stamping 60 is next solution heat treated to bring it to a "W" metallurgical condition, and then is frozen to render its metalography dormant. The stamping is returned to the same third die for cold-forging, to a form shown in FIG. 7, then artificially aged to a "T8" metallurgical condition, and trimmed to produce a second stamping 65—see FIG. 8. If webs 46 and 47 are not desired, these can be removed at the trimming operation.

The sabot half is now ready for anodizing or other final treatment.

It has been found that sabot halves made as described above are of precise dimensions and maintain their dimensional stability. A considerable cost reduction is also accomplished by following the stamping procedures instead of the previous machining operations.

OPERATION OF THE INVENTION

The operation of the projectile with a stamped sabot is the same as with previous machine sabots. Upon firing, the propulsion gases from explosive 13 force the sabot out of the cartridge at the crimped joint and propel the projectile down the cannon barrel 16, obturator 13 riding in the rifling of the barrel to prevent escape of propulsion gases and decouple rifling spin action to the projectile. As the projectile moves out of the barrel, centrifical force causes the halves 40 and 41 of the sabot to separate, releasing cap 26, and the resulting aerodynamic forces overcome the strength of ring 31 and permit the sabot to separate completely from buttress grooves 21 of the projectile along the mating plane, so that an aerodynamically clean projectile proceeds towards its target.

Numerous characteristics and advantages of the invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

I claim:

1. The method of manufacture in metal which comprises the steps of upsetting a workpiece, having a longitudinal axis, by axial force in a first die, to constitute a first preform having a desired uneven mass distribution along said axis, and hot forging the preform, by transverse force in a second die, to constitute a second preform having a desired unsymmetrical mass distribution transverse to said axis.

2. A method according to claim 1 with the further step of hot forging the second preform in a third die, by transverse force, to constitute a stamping having opposite, unsymmetrical formed surfaces.

* * * * *